No. 894,082. PATENTED JULY 21, 1908.
W. S. TEEPLE.
GLASS BLOWING MACHINE.
APPLICATION FILED FEB. 28, 1907.
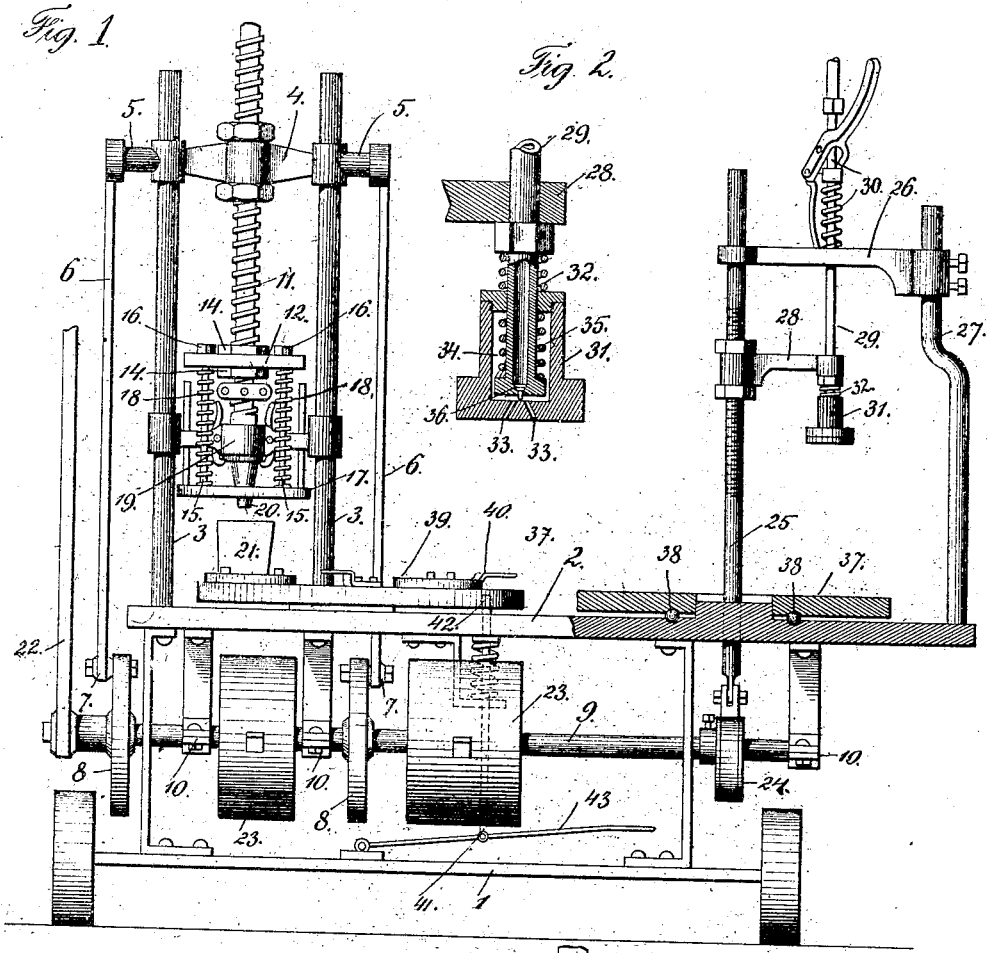
WITNESSES:
A. H. Rabság,
INVENTOR
William S. Teeple
BY H. C. Evert & Co
Attorneys

UNITED STATES PATENT OFFICE.

WILLIAM S. TEEPLE, OF WELLSBURG, WEST VIRGINIA.

GLASS-BLOWING MACHINE.

No. 894,082.　　　Specification of Letters Patent.　　　Patented July 21, 1908.

Application filed February 28, 1907. Serial No. 359,838.

*To all whom it may concern:*

Be it known that I, WILLIAM S. TEEPLE, a citizen of the United States of America, residing at Wellsburg, in the county of Brooke and State of West Virginia, have invented certain new and useful Improvements in Glass-Blowing Machines, of which the following is a specification, reference being had therein to the accompanying drawing.

This invention relates to glass blowing machines of that type designed for forming glass and blowing the same to a desired shape, within a mold.

The present invention is an improvement on a patent granted to myself and Samuel G. Johnson, for a glass blowing machine, patented April 21st, 1903, No. 726,112, wherein we disclosed a portable machine comprising a common shaft that can be easily and conveniently operated to lower a mechanism onto a mold, said mechanism comprising a plunger and blow pipes, the latter having arranged therein check valves adapted to be automatically opened when in a lowered position, to subject the contents of the mold to air pressure and form the contents thereof into proper shape. In the operation of this machine, it was necessary to handle and manually place the molds beneath the plunger of the machine.

The present invention aims to provide revoluble disks for supporting a plurality of molds, which are successively moved beneath the plunger of the machine to be operated upon thereby. In connection with the revoluble disks, I employ novel means for holding a disk in a fixed position and properly positioning a mold beneath the plunger.

The detail construction entering into this improvement will be hereinafter more fully described and then specifically pointed out in the appended claims, and referring to the drawing forming part of this specification, like numerals of reference designate corresponding parts throughout the several views, in which:—

Figure 1 is an elevation partly in section, of a machine constructed in accordance with my invention, Fig. 2 is an enlarged vertical sectional view of the lower end of one of the blow pipes of the machine, illustrating a check valve arranged therein, Fig. 3 is an enlarged elevation of an eccentric employed to operate the blow pipe, Fig. 4 is an elevation of an eccentrically mounted weight for returning a portion of the operating mechanism of the machine to its normal position after said mechanism has been operated.

In the accompanying drawings, 1 designates a truck or carriage having a table 2, said table at its one end carrying upwardly extending standards 3, upon which is slidably mounted a yoke 4 having trunnion arms 5 connecting with pitman rods 6, one of said rods extending through the table 2 and both of said rods connecting with wrist pins 7 carried by disks 8 mounted upon a shaft 9. The shaft 9 is journaled in hangers 10 carried by the table 2.

A screw 11 passes through the yoke 4 and carries a cross head 12 which is adjustably mounted upon the screw 11 by a jam nut 14. Slidably mounted in said cross head are rods 15, said rods at their upper ends being provided with heads 16 and at their lower ends with a rigid plate 17. Interposed between the yoke 12 and the plate 17 and surrounding the rods 15 are coiled springs 18.

Mounted upon the lower end of the screw 11 is a yoke 19 which slides upon the standards 3. The yoke 19 carries a detachable plunger head 20, extending through the plate 17 and adapted to enter a mold 21.

One end of the shaft 9 is provided with a hand operating lever 22 which is employed for the purpose of operating the mechanism just described. To normally hold the mechanism in the position illustrated in the accompanying drawings, I eccentrically mount upon the shaft 9, weights 23. The shaft 9 upon its opposite end is provided with an eccentric 24 which is connected to a reciprocating rod 25, said rod extending upwardly through the table 2. The rod 25 extends through an adjustable arm 26 carried by a standard 27 of the table 2. The rod 25 carries an adjustable bracket 28 having a vertically disposed stand pipe 29, said stand pipe passing through the arm 26 and being provided with a conventional form of air coupling 30. Upon the lower end of the pipe 29 is adjustably mounted a head 31, said head supporting a coiled spring 32 which engages the bracket 28. The head 31 is provided with angularly disposed ports 33 communicating with an air chamber 34 formed in said head. Located within said air chamber and supporting the head is a coiled spring 35. The head 31 is adapted to open a check valve 36 formed in the lower enlarged end of the pipe 29.

The present invention resides principally in providing the table 2 with two revoluble supporting plates 37, said plates being mounted upon ball bearings 38 surrounding one of the standards 3 and the rod 25. Upon said plates are detachably mounted rings or bands 39 in which the molds 21 are placed. To rotate the plates 37, I provide said plates with handles 40, and in order to hold said plates, I use a spring pressed rod 41, said rod extending upwardly through the table 2, and engaging in a notch 42 located adjacent to each band or ring 39. The rod 41 is manipulated by a treadle 43, pivotally mounted upon the truck or carriage 1. I have only illustrated one complete plate and its moving and stopping devices, but I desire it to be understood that the plates of one machine will be similarly constructed.

It is obvious that when the lever 22 is manipulated that the rod 25 and the plunger 20 will be lowered to operate upon the molds located beneath the plunger and the head 31. After each operation, the plates 37 are revolved to place another mold beneath the plunger and head, thus it will be noted that by one operation of the operating lever, a vessel can be formed within a mold while another vessel is being blown.

What I claim and desire to secure by Letters Patent, is:—

1. A glass-blowing machine comprising a portable table having a plurality of annular bosses, said table further provided with an annular groove surrounding each of the bosses and constituting one-half of a ball race, a shiftable mold-supporting plate surrounding each of the bosses and having its lower face formed with an annular groove constituting the other half of a ball race, bearing balls mounted in said races, a rock shaft supported below the table, a pair of uprights carried by the table, one of said uprights extending through one of said bosses, a reciprocatory plunger head guided by said uprights, a pair of pitman rods connected with said plunger head, one of said pitman rods extending through that boss through which extends an upright, a pair of disks carried by said shaft and connected to the pitman rods, a reciprocatory rod extending through the other of said bosses, an eccentric carried by the shaft and connected to said last mentioned rods, a blower head carried by said last mentioned rod, and means extending through the table and engaging with a plate for retaining it in shifted position.

2. A glass-blowing machine comprising a portable table having a plurality of annular bosses, said table further provided with an annular groove surrounding each of the bosses and constituting one-half of a ball race, a shiftable mold-supporting plate surrounding each of the bosses and having its lower face formed with an annular groove constituting the other half of a ball race, bearing balls mounted in said races, a rock shaft supported below the table, a pair of uprights carried by the table, one of said uprights extending through one of said bosses, a reciprocatory plunger head guided by said uprights, a pair of pitman rods connected with said plunger head, one of said pitman rods extending through that boss through which extends an upright, a pair of disks carried by said shaft and connected to the pitman rods, a reciprocatory rod extending through the other of said bosses, an eccentric carried by the shaft and connected to said last mentioned rods, a blower head carried by said last mentioned rod, means extending through the table and engaging with a plate for retaining it in shifted position, eccentrically-mounted weights carried by said shaft and tending to normally maintain the plunger head and blower head in an elevated position, and a handle connected to one end of the rock shaft for actuating it.

3. A glass-blowing machine comprising a portable table having a plurality of annular bosses, said table further provided with an annular groove surrounding each of the bosses and constituting one-half of a ball race, a shiftable mold-supporting plate surrounding each of the bosses and having its lower face formed with an annular groove constituting the other half of a ball race, bearing balls mounted in said races, a rock shaft supported below the table, a pair of uprights carried by the table, one of said uprights extending through one of said bosses, a reciprocatory plunger head guided by said uprights, a pair of pitman rods connected with said plunger head, one of said pitman rods extending through that boss through which extends an upright, a pair of disks carried by said shaft and connected to the pitman rods, a reciprocatory rod extending through the other of said bosses, an eccentric carried by the shaft and connected to said last mentioned rod, a blower head carried by said last mentioned rod, means extending through the table and engaging with a plate for retaining it in shifted position, an upright carried by the table, an adjustable arm connected with the last mentioned upright and loosely connected to the blower head carrying rod, and a vertically-extending stand-pipe supported by said arm and connected to the blower head.

In testimony whereof I affix my signature in the presence of two witnesses.

WILLIAM S. TEEPLE.

Witnesses:
MAX H. SROLOVITZ,
A. J. TRIGG.